Figure 1:
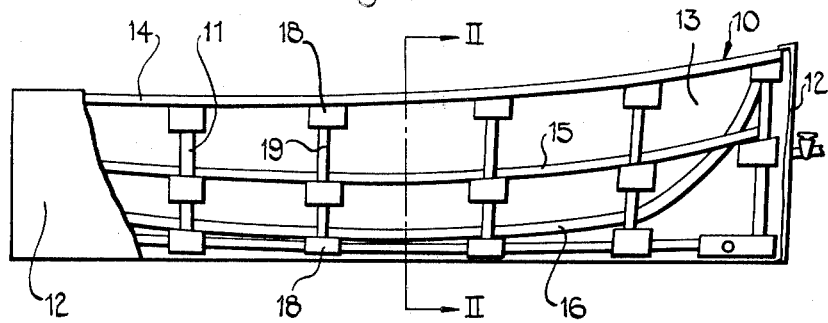

United States Patent [19]

Western

[11] 4,179,093
[45] Dec. 18, 1979

[54] MOULDING APPARATUS

[76] Inventor: William J. T. Western, 4 Elston Ave., Denistone, New South Wales, Australia, 2114

[21] Appl. No.: 938,839

[22] Filed: Sep. 1, 1978

[30] Foreign Application Priority Data

Sep. 5, 1977 [AU] Australia ............................... PD1513
Mar. 22, 1978 [AU] Australia ............................... PD3767

[51] Int. Cl.² .......................... B28B 7/32; B28B 7/06; B29C 5/00; B29C 1/16
[52] U.S. Cl. ........................................ 249/65; 249/83; 249/91; 425/405 R; 264/219
[58] Field of Search ..................... 249/65, 91; 425/388, 425/128, 470, 187 R, 405 R, 389; 264/32, 45, 219; 156/242, 245

[56] References Cited
U.S. PATENT DOCUMENTS

| | | | |
|---|---|---|---|
| 2,411,497 | 11/1946 | Barnes .......................... | 425/388 X |
| 2,832,995 | 5/1958 | McCaw ......................... | 425/405 |
| 2,892,239 | 6/1959 | Neff ............................. | 249/65 |
| 2,948,047 | 8/1960 | Peeler et al. ................. | 249/65 |
| 3,124,626 | 3/1964 | Graham et al. ............... | 425/128 X |
| 3,139,464 | 6/1964 | Bird et al. .................... | 249/65 |
| 3,734,670 | 5/1973 | Stickler ........................ | 249/65 X |
| 3,814,372 | 6/1974 | Western ....................... | 249/65 |
| 3,832,745 | 9/1974 | Dorfman ....................... | 156/242 |
| 3,862,736 | 1/1975 | Herro ........................... | 249/65 |
| 4,073,049 | 2/1978 | Lint .............................. | 264/219 |

Primary Examiner—J. Howard Flint, Jr.
Attorney, Agent, or Firm—Irvin A. Lavine

[57] ABSTRACT

Moulding apparatus for moulding an open-top bowl-like shell, such as a boat hull, comprising:
(a) a flexible form layer adapted to form a moulding face for the shell,
(b) template means defining an edge around a curved part of the shell, and
(c) containment means adapted to form together with the form layer a fluid tight container, the arrangement being characterized by the provision within the container of further template means corresponding in shape to a contour or surface portion of the curved part of the shell, the form layer being drawn down to overlie and be supported by the further template means when the container is evacuated.

11 Claims, 9 Drawing Figures

MOULDING APPARATUS

The present invention relates to improved moulding apparatus for the formation of open-top bowl-like shells; to flexible form layers for use in moulding apparatus; and to coupling blocks useful in the construction of moulding apparatus.

In the present inventor's Australian patent specification No. 477,132 there is disclosed moulding apparatus for moulding an open-top bowl-like shell having a curved surface in which a flexible form layer is maintained in a desired configuration by a differential fluid pressure between its moulding face and its other face. The flexible form layer is affixed to a rigid template corresponding to the free edge of the curved surface of the shell but is otherwise held in shape by the said fluid pressure. If the shell to be moulded is of any complexity the form layer of this prior art arrangement must be made up in a plurality of pieces which are affixed together as by glueing or sewing. The process of making up this form layer has proved to be difficult particularly if a number of pieces of form layer must be joined together to enable the form layer to be drawn into the desired shape by the fluid pressure.

The present inventor has now discovered that by the use of additional template means in the moulding apparatus the difficulties encountered with the prior art arrangement may be substantially overcome. These additional template means will lie within the fluid tight container which surrounds one side of the form layer and the form layer will directly bear against and be supported by the said additional template means when the form layer is drawn into a condition of tensed stiffness by the fluid pressure differential.

In this aspect the present invention consists in a moulding apparatus for use in the formation of an open-top bowl-like shell whereof at least some of the surface is curved, comprising:

(a) a flexible form layer adapted to be formed into a moulding face for the said shell, (b) first template means having an edge corresponding in shape to the desired shape of the shell rim bordering said curved surface, (c) further template means having an edge or surface corresponding in shape to a contour of the said curved surface of the shell or to a surface portion of the shell which forms part of the curved surface or is surrounded by it, and (d) containment means adapted to form, together with the flexible form layer, a fluid tight container enclosing the said further template means, the container being adapted to be connected to means to vary the fluid pressure within the container so that the fluid pressure on the moulding face of said form layer is different from that on its opposite face to thereby urge said layer into a condition of tensed stiffness in which condition the form layer directly bears against and is supported by the said further template means and the form layer assumes the shape required of the surface of the shell to be formed.

In addition to simplifying the formation of the form layer the arrangement according to this aspect of the invention allows a far wider range of material to be used to make the form layer. Using the arrangement according to the prior art arrangement if the moulding apparatus is to be disassembled and moved to a new site the fabricated form layer has to be folded-up which causes creasing of the form layer. The creasing causes defects in subsequently moulded shells. This problem could only be overcome by using a form layer made of a material such as neoprene rubber which will not be permanently creased by being folded up. The arrangement according to the present invention allows a far wider range of materials to be used to make the form layer, the only requirement being that the material be sufficiently flexible as to be rollable to render it readily transportable. This advantage flows from the fact that the additional template means may be so placed that joins in the form layer fall along the additional template means thereby allowing the form layer to be made up by removably attaching the edges of the individual parts of the form layer to the additional template means. If the moulding apparatus is to be moved it is then possible to remove the individual parts of the form layer and to roll them up, without creasing, for reuse.

The ability to use a wide variety of different materials to form the form layer is of particular advantage if the form layer is to be removed from the moulding apparatus and to remain attached to the moulded shell as a surface thereof. A moulded shell can thereby be formed with a surface layer of, for example, a synethetic plastics material or a metal foil, during the moulding process itself.

The form layer for use in this aspect of the invention is preferably relatively inelastic however in some moulding applications a limited degree of elasticity is highly desirable. In this respect it has been found that fabric backed sheets of polyvinyl chloride (P.V.C.) are particularly preferred. The elasticity of the form layer, when present, may be uniform in all directions or the elastically anisotropic form layer according to another aspect of this invention may be used with advantage.

The containment means preferably comprises a frame covered by a fluid impervious surrounding means which is preferably flexible. In a particularly preferred embodiment of the invention the frame is made of rod means removably connected by coupling blocks. The rod means are desirably cardboard tubes and the coupling blocks are formed of a readily workable material such as polystyrene foam or balsa wood. The use of such a frame covered by a flexible sheet such as a sheet of polyethylene has the advantage that the containment means may be readily disassembled and re-erected in another place. In an alternative embodiment of this invention the containment means may comprise a rigid, permanent or semi-permanent structure. It may for instance be made of bricks or concrete. In this case the frame and the surrounding means are effectively formed unitarily and a separate surrounding layer is not required.

The first and further template means may be formed of wood, plastic, cardboard or any other readily workable material which has sufficient rigidity to support the form layer. In preferred embodiments of the invention it is preferred that the template means be flexible in at least one direction in order to allow it to be readily curved along a contour or surface of the shell. A material which has been found to be particularly suitable for the construction of the template means is a laminate of cardboard sandwiched on either side of a sheet of a flexible plastics material foam. This material may be readily cut to suit the outline of a portion of a shell and then itself curved to provide a contour which curves in two planes.

In another aspect the invention consists in a moulding apparatus for use in the formation of an open-top bowl-like shell whereof at least some of the external surface is curved comprising:
 (a) a flexible form layer adapted to be formed into a moulding face for the said shell,
 (b) template means having an edge corresponding in shape to the desired shape of the shell rim bordering said curved surface, and
 (c) containment means adapted to form together with the flexible form layer, a fluid tight container enclosing the said further template means of the shell to be formed, the flexible form layer comprising a laminate of two or more sheets of material, each of which is of anisotropic elasticity, the axes of minimum elasticity of the said sheets lying transversely of one another.

In this aspect the present invention lies in a novel flexible form layer comprising a laminate of two or more sheets each of which has an axis of minimum elasticity, i.e. is elastically anisotropic. The sheets are so arranged that their axes lie transversely to one another. The sheets are preferably formed of an elastic material such as a neoprene rubber in which is embedded an array of parallel, substantially inelastic threads, in this arrangement the axis of minimum elasticity will lie parallel to the threads. Form layers according to this aspect of the invention have the advantage that if shells having compound curves are to be moulded in the form layer may be made up without the need for additional template means other than the template means defining the shape of the shell rim bordering its curved surface. This advantage is achieved by securing each sheet to the said template such that the length of each thread of the sheet between the points at which that thread is connected to the said template equals the desired distance over the surface of the curved part of the shell between the corresponding positions on the rim of the shell surrounding the curved part.

It is desirable that there be three sheets of elastically anisotropic material making up the form layer, each of the axes of minimum elasticity being offset by 60° relative to its adjacent axes. In this way a shell having a complicated compound curve may be accurately moulded in the moulding apparatus according to this aspect of the present invention.

In order to facilitate the drawing of all of the sheets making up the form layer into a state of tensed stiffness it is desirable that the sheets which do not form the moulding face are perforated. This allows the fluid pressure to be more evenly applied to all of the sheets. In a particularly preferred arrangement all of the sheets are perforated and an additional imperforate sheet is provided to constitute the moulding face of the form layer; this additional sheet need not be elastically anisotropic.

Accordingly in a still further aspect there is a coupling block of foamed plastics or like material having at least one flat surface and being formed with three holes, the longitudinal axis of which is orthagonal to the longitudinal axis of each of the other holes.

The connecting coupling block is preferably a rectangular prism with each of the holes opening into a face lying in a plane orthogonal to the face into which the other holes open. In a particularly preferred embodiment two of the holes extend right through the coupling block while the third hole is a blind hole.

The coupling block has the advantage that the block may be connected to the rods by insertion of the rods into the holes and may be also connected to the surface layer of the containment means as by glueing that surface layer to the said flat surface.

Figure 2:
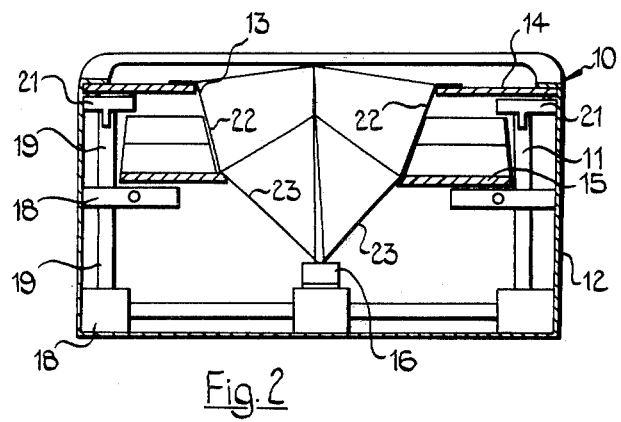
Figure 3:
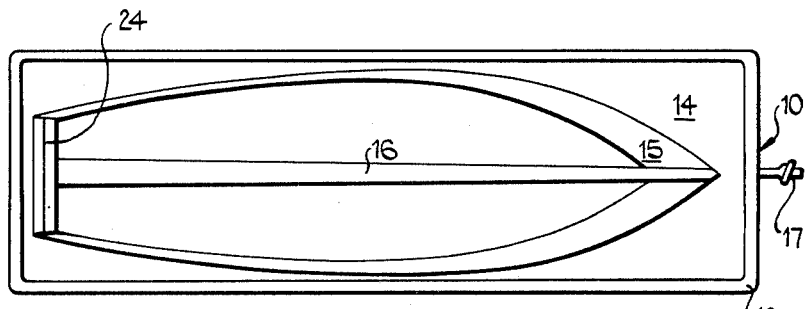
Figure 4:
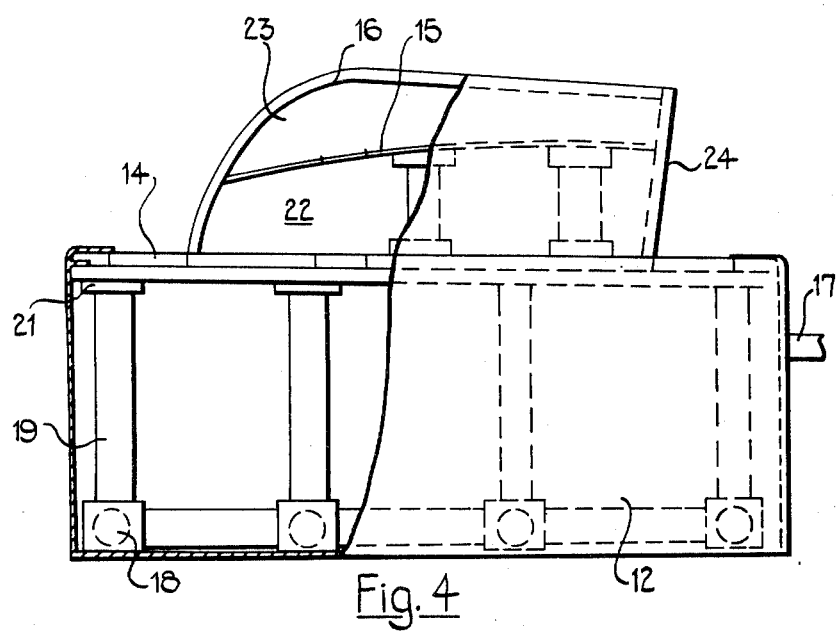
Figure 5:
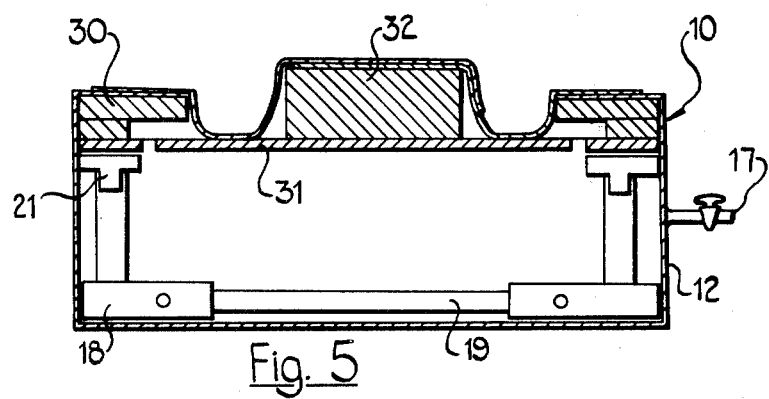
Figure 6:
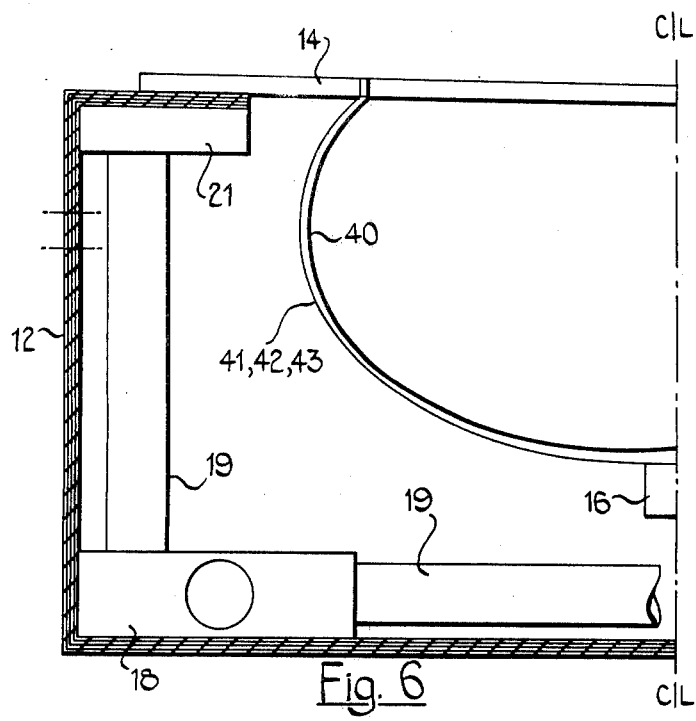
Figure 7:
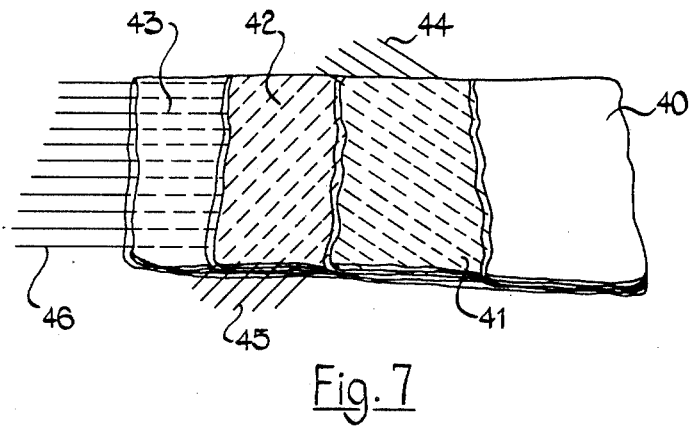
Figure 8:
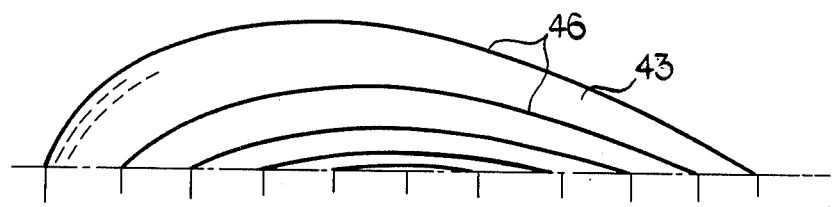
Figure 9:
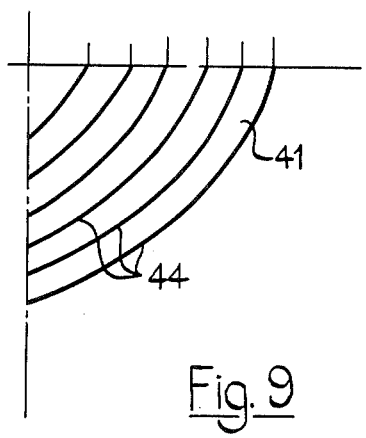

Hereinafter given by way of example only is a preferred embodiment of the three aspects of the present invention described with reference to the accompanying drawings in which:

FIG. 1 is a side elevational view of a moulding apparatus according to this invention, FIG. 2 is a cross sectional view of the moulding apparatus of FIG. 1 taken along II—II, FIG. 3 is a plan view of the moulding apparatus of FIG. 1, with the form layer removed to reveal the template means, FIG. 4 is a partly cut away side elevational view of a further embodiment of a moulding apparatus according to this invention, FIG. 5 is a longitudinal sectional view of a still further embodiment of a moulding apparatus according to this invention, FIG. 6 is a cross sectional view to the centreline of a moulding apparatus incorporating a form layer made up of a laminate of sheets of anisotropic elasticity, FIG. 7 is a partly cut away surface view of a portion of the form layer included in the moulding apparatus of of FIG. 6, FIG. 8 is a diagrammatic sketch showing the disposition of the inelastic threads in one sheet of the form layer in the moulding apparatus of FIG. 6, FIG. 9 is a diagrammatic sketch showing the disposition of the inelastic threads in another sheet of the form layer in the moulding apparatus of FIG. 6, The moulding apparatus 10 of FIGS. 1 to 3 is adapted to mould a boat hull and comprises a frame 11 surrounded by an air impervious cover 12, and a form layer 13 to provide an air tight container. The shape assumed by the form layer 13 under the influence of a pressure differential being determined by the top template 14, the chine template 15 and the keel template 16. Outlet means 17 are provided for connection to air evacuation means (not shown) to reduce the air pressure within the container.

The frame 11 comprises a plurality of polystyrene blocks 18 connected by spirally wrapped cardboard tubes 19. Each block 18 is a rectangular prism and is formed with three holes mutually orthagonal to one another. One hole extends right through the block and opens into each of the opposed pairs of long faces of the block. A further blind hole opens into one of the short faces of the block. The blocks 18 are each connected to adjacent blocks by the tubes 19 which frictionally engage in the hole in the blocks 18. The cover 12 is adhered to the outwardly facing flat surfaces of those blocks 18 which are adjacent the outer periphery of moulding apparatus. The template 15 is supported by adjacent blocks 18 the upper surfaces of which have been cut to match the curvature of the template.

The template 14 rests on blocks 21 each of which is provided with or downwardly extending plug 20, as seen in FIG. 3, which extends into the upper end of an associated tube 19. The upper surface of blocks 19 are cut to conform to the curvature of the template 14.

The template 14 defines the bulwark line of the hull to be moulded in terms of its outline and its upward curvature from its stern to its stern. Similarly the template 15 defines the chine line and the template 16 defines the keel line.

The form layer 13 is made up of two pairs of matching form parts 22 and 23. Each form parts 22 extend from the bulwark template 14 to the chine template 15 and from the stern of the boat where it is connected to the fore part of the keel template 16 to a rigid stern plate moulding face 24. Each part 22 is held in place against the various templates by being adhered thereto with an adhesive. The parts 23 are similarly adhered to the chine template 15, the keel template 16 and the stern plate moulding face 24.

When the form layer parts 22 and 23 are in place the moulding face of the form layer is coated with a wax polish to ensure more ready release of the moulded hull from the form layer and to fill any gaps between the abutting edges of the form layers parts 22 and 23 or between the form layer parts 22 and 23 and the stern plate moulding face 24. Air is then evacuated from the container through the valve means 17 and the moulding face is thereby urged into a state of tensed stiffness in which the form layer 13 overlies and abuts against the further templates in the form of chine template 15 and keel template 16.

A significant advantage of the arrangement of this invention over the disclosure of the present inventor's earlier patent specification is that after the templates have been cut and assembled they can be used as a jig for the cutting of the form layer parts thereby considerably facilitating this operation.

The arrangement according to FIG. 4 is essentially similar to the arrangement according to FIGS. 1 to 3, and identical numeration is used for corespronding parts. The moulding apparatus of FIG. 4 is of a male configuration as compared with the female configuration of the moulding apparatus of FIGS. 1 to 3.

FIG. 5 shows a further moulding apparatus according to the present invention and adapted to mould a decorative panel. The moulding apparatus 10 includes a frame of the type described above formed from blocks 18 and 21 and tubes 19, the frame being covered with an air impervious cover layer 12.

A peripheral template 30 defines the outer rim of the curved surface of the shell to be moulded while templates 31 and 32 define planar surfaces of the moulded shell which are surrounded by curved surfaces of the shell.

In this arrangement it is preferred that the form layer 13 has a degree of elasticity as this facilitates the formation of the moulding face without the necessity of joining form layer parts together provided that the desired shape can be achieved within the elastic limits of the form layer. It is also desirable that the form layer be drawn out to a degree approaching its elastic limit by the reduced air pressure within the container to avoid undue stretching of the form layer as the material from which the shell is to be made is applied to the moulding face of the form layer.

The form layer 13 may be provided with a decorative surface finish on its underside i.e. the side opposite the moulding face. If the form layer is then removed from the moulding apparatus with the moulded shell the shell is provided with a decorative finish while it is being made. The form layer is preferably made of a cloth backed P.V.C. material as the cloth backing provides good adhesion to the moulding material while the vinyl surface provides an attractive external surface for the moulded article.

FIGS. 6 to 9 show a moulding apparatus according to a further aspect of the invention wherein the form layer is made up of a laminate of sheets each of which is elastically anisotropic.

The moulding apparatus of FIG. 6 has a frame similar to that shown in FIG. 1 and identical numbers have been used for corresponding parts. A bulwark template 14 and a keel template 16 are provided and serve the same purpose as the corresponding parts of the moulding apparatus of FIG. 1.

The form layer is made up of four superposed sheets 40, 41, 42 and 43. The sheet 40 provides the moulding face of the form layer 13. Each of the sheets 41, 42 and 43 is formed of a perforated sheet of an elastic rubber material in which are embedded a parallel array of threads 44, 45 and 46 of a substantially inelastic synthetic plastics material. The presence of these threads renders the sheets elastically anisotropic as they are less elastic in a direction parallel to the longitudinal axes of the threads than in any other direction.

In the moulding apparatus the sheets are laid one on top of the other with the sheet 40 uppermost and the thread arrays 44, 45 and 46 lying with their respective longitudinal axes offset by 60° from one another. The sheets 40, 41, 42 and 43 are each affixed to the templates 14 and 16 but are not connected to one another elsewhere. The sheets 41, 42, 43 are so affixed to templates 14 and 16 that the length of each of the threads of the thread arrays 44, 45 and 46 respectively between the points at which that thread is connected to the templates 14 and 16 equals the desired distance over the surface of the curved part of the shell to be moulded along the path that that thread will follow when it is drawn into a tensed condition by the reduction of the air pressure within the container.

In making up the form layer for use in this aspect of the invention it is necessary to determine the desired length of each thread in the array in each sheet and to mark this out on the sheet. The sheet is then connected to the templates along the line marked on the sheet. FIGS. 8 and 9 show the disposition of selected threads of the arrays 44 and 46 will assume in the moulding apparatus of FIG. 6.

I claim:

1. A moulding apparatus for use in the formation of an open-top bowl-like shell whereof at least some of the surface is curved, comprising:
   (a) a flexible form layer adapted to be formed into a moulding face for the said shell,
   (b) first template means having an edge corresponding in shape to the desired shape of the shell rim bordering said curved surface,
   (c) further template means having an edge surface corresponding in shape to a contour of at least a portion of said curved surface of the shell and
   (d) containment means to form, together with the flexible form layer, a fluid tight container enclosing the said further template means,
   the container being connected to means to vary the fluid pressure within the container so that the fluid pressure on the moulding face of said form layer is different from that on its opposite face to thereby urge said layer into a condition of tensed stiffness in which condition the form layer directly bears against and is supported by the said further template means and the form layer assumes the shape required of the surface of the shell to be formed.

2. A moulding apparatus as claimed in claim 1 in which the form layer is removably attached to said further template means such that the form layer may remain attached to, and form a surface of, a shell moulded in the moulding apparatus.

3. A moulding apparatus as claimed in claim 1 in which the form layer is affixed to the further template means.

4. A moulding apparatus as claimed in claim 1 in which the containment means comprises a rigid frame surrounded by a flexible, fluid impervious, sheet.

5. A moulding apparatus as claimed in claim 1 in which the further template means supports the form layer along a line which curves in two planes.

6. A moulding apparatus for use in the formation of an open-top bowl-like shell whereof at least some of the external surface is curved comprising:
    (a) a flexible form layer adapted to be formed into a moulding face for the said shell,
    (b) template means having an edge corresponding in shape to the desired shape of the shell rim bordering said curved surface, and
    (c) further template means having an edge surface corresponding in shape to a contour of at least a portion of said curved surface of the shell, and
    (d) containment means to form together with the flexible form layer, a fluid tight container enclosing the said further template means of the shell to be formed, the flexible form layer comprising a laminate of at least two sheets of material, each of which is of anisotropic elasticity, the axes of minimum elasticity of the said sheets lying transversely of one another.

7. A moulding apparatus as claimed in claim 6 in which at least one of said sheets is formed from perforated elastic material in which is embedded a parallel array of inelastic threads.

8. A moulding apparatus as claimed in claim 1 in which the apparatus further comprises a frame comprised of a coupling block of foamed plastics having at least one flat surface and being formed with three holes, the longitudinal axis of which is orthagonal to the longitudinal axis of each of the other holes.

9. A moulding apparatus according to claim 8 comprising a plurality of said coupling blocks interconnected by tubes formed of spirally wound cardboard.

10. A moulding apparatus as claimed in claim 1 in which the form layer is made from a rollable sheet material.

11. A moulding apparatus as claimed in claim 1 in which the first template means and the further template means together provide a cutting and assembly jig for the tailoring of the form layer.

* * * * *